Figure 1:
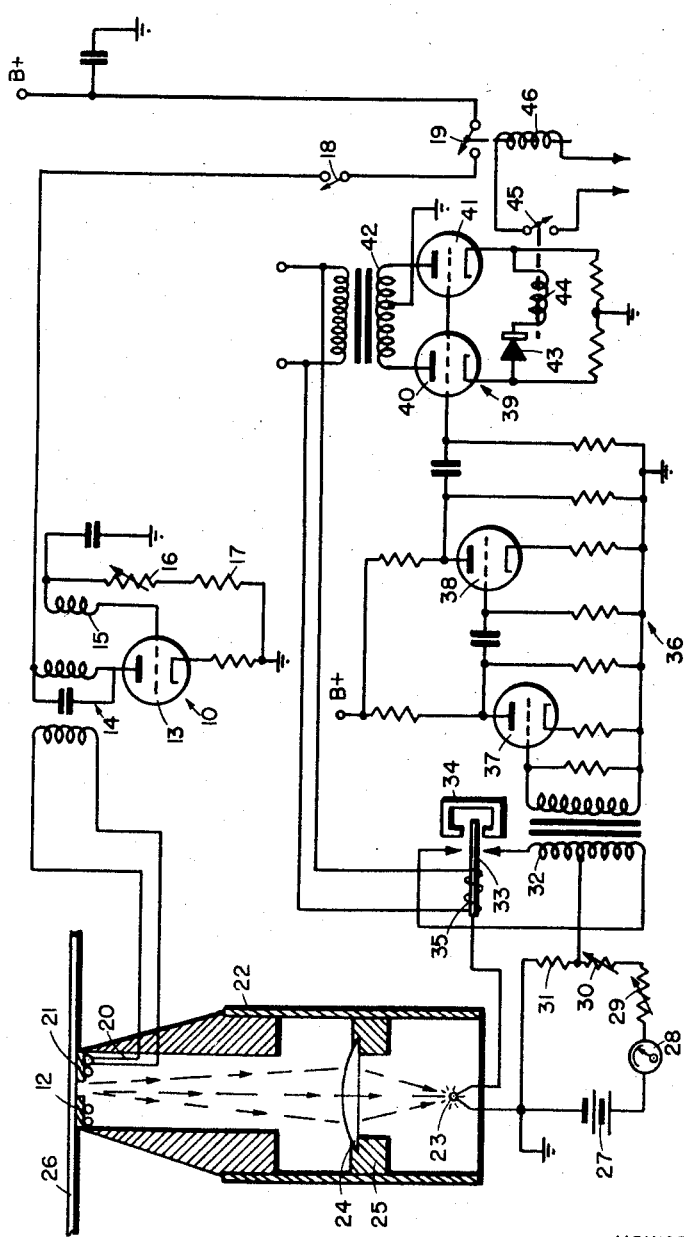

Dec. 23, 1958    H. H. KENKEL    2,866,064
TEMPERATURE CONTROLLED HEATING SYSTEM
Filed April 23, 1957    2 Sheets-Sheet 1

INVENTOR.
HOWARD H. KENKEL
BY Allan Rothenberg
ATTORNEY

Dec. 23, 1958  H. H. KENKEL  2,866,064
TEMPERATURE CONTROLLED HEATING SYSTEM
Filed April 23, 1957  2 Sheets—Sheet 2

INVENTOR.
HOWARD H. KENKEL
BY Allan Rothenberg
ATTORNEY

United States Patent Office 2,866,064
Patented Dec. 23, 1958

2,866,064

TEMPERATURE CONTROLLED HEATING SYSTEM

Howard H. Kenkel, La Canada, Calif., assignor to North American Aviation, Inc.

Application April 23, 1957, Serial No. 654,574

7 Claims. (Cl. 219—10.77)

This invention relates to improved heating apparatus and more particularly to a temperature controlled heating system for accurately heating a relatively small area of a part to a predetermined temperature.

The broadly novel features of this invention are illustrated as applied to apparatus designed for the purpose of heating relatively small areas of formed titanium parts of a variety of configurations. Such parts are commonly heated by means of an acetylene torch which may cause oxidation and embrittlement from overheating if not carefully controlled. The induction heating system of the present invention overcomes these difficulties by inducing heat directly in the part to be heated and then removing or controlling the source of heat in accordance with the sensed temperature of the heated part.

In accordance with the present invention there is provided an induction heating coil and an induction generator therefor, a focused heat beam temperature sensing means which is spaced from the coil for generating an electrical signal in response to heat radiated axially of the coil, a calibrated adjustable source of reference signal, and an amplifying and control circuit responsive to a predetermined sense of the difference between the temperature and reference signals for controlling the induction generator and thereby the temperature of the heated part. The control may be of an on-off nature which completely de-energizes the induction generator when a desired part temperature has been reached. Alternatively a proportional control may be utilized to increase or decrease the generator output as the part temperature varies from a predetermined value.

In order to accommodate the heating of parts of a variety of different sizes, shapes and thicknesses, the present invention is specifically adapted to heat a relatively small circular area which may be on the order of one inch in diameter. The time required for heating by this method is substantially less than that required to heat the same area with a torch. Titanium is particularly suited for heating by inductive methods by reason of its poor conductivity and higher resistance than comparable metals.

Heating an area of a part of any configuration is achieved by locating the area to be heated immediately adjacent to the coil. The temperature control circuit which has been preset to the desired part temperature will then operate to shut off the heat when the heated area reaches the desired temperature.

It is an object of this invention to provide an improved temperature controlled heating system.

Another object is the provision of a heating system wherein the sensitive temperature sensing element is removed from the influence of the heat source.

A further object of this invention is the provision of apparatus adapted to heat a variety of irregularly shaped parts and to precisely control temperature of the center of the heated area.

A further object is the decrease of the response time of a temperature controlled heating system.

Still another object is the provision of an improved combination of reference and sensing apparatus for the precision control of a heating system.

These and other objects will become apparent from the description which follows.

Figure 2:
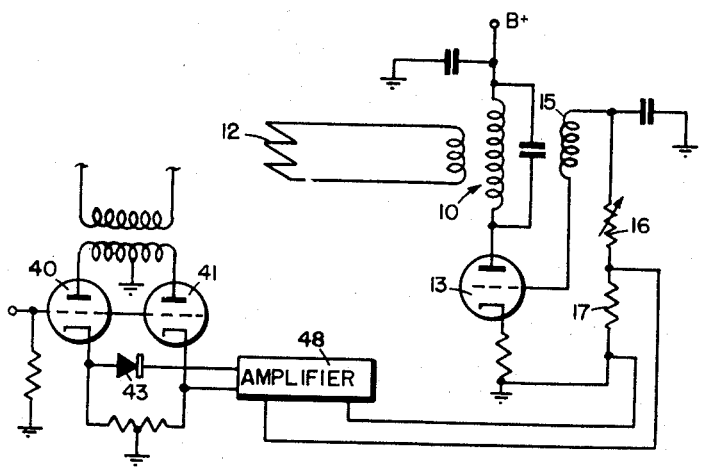

Fig. 1 comprises a diagrammatic illustration of a temperature controlled heating system constructed in accordance with the principles of this invention, and Fig. 2 illustrates a modification of the apparatus of Fig. 1.

Referring now to Fig. 1, a substantially conventional induction heating generator is shown as basically comprising an oscillator 10 the output of which is fed to induction heating coil 12. The oscillator may comprise a vacuum tube 13 having a plate tank circuit 14 and a regenerative feedback circuit including winding 15, variable impedance 16 and bias resistor 17. Power is supplied to the plate of the tube from a power source (not shown) through a main switch such as the foot switch 18 and the normally closed contacts 19 of a power control relay which is actuated by apparatus to be described hereinafter. The heating coil 12 is of a flat or pancake configuration and formed of a relatively small number such as two or three turns of copper tubing. The outside diameter of the coil may be on the order of 1 inch while the inside diameter, through which heat radiated by the heated part is passed, may be on the order of a quarter inch in diameter. The coil is supported by a pair of low inductance copper leads 20 from the generator and is protected by an annular cap 21 of transite or the like which may be replaced if damaged. The cap 21 is impervious to radiated heat which then can pass only axially through the center of the coil. The coil 12 together with a focused heat beam temperature sensing device is mounted in a housing 22 with the coil at one end thereof and the radiation sensitive element at the other end thereof. The temperature sensing device is a substantially conventional apparatus such as, for example, the radiation pyrometer series 939A4 manufactured by Minneapolis-Honeywell which converts radiant energy into electrical energy. The electrical energy is generated by a thermopile 23 suitably mounted at the lower end of housing 22 and comprising a radial assembly of relatively minute thermocouples wired in series to multiply the voltage thereof. The amount of radiant heat energy received by thermopile 23 determines the temperature to which the pile will rise and thus determines the voltage output of the thermopile. A heat focusing lens 24 of calcium fluoride is mounted on supports 25 between the thermopile and the coil. Thus heat radiated from an object 26 placed over the upper end of the housing and inductively heated by the coil 12 is radiated axially of the housing and coil and is focused by the lens 24 upon the thermopile 23.

A calibrated adjustable circuit for generating a reference voltage comprises a fixed voltage source 27 such as a single mercury cell which is series connected with a meter 28, calibrating resistor 29, temperature adjustment resistor 30 and output resistor 31. The voltage reference circuit is utilized to supply an accurate stable voltage to balance the voltage from the thermopile. The temperature signal from the thermopile 23 is alternatively fed to opposite ends of a coil 32 through a vibrating chopper arm 33 actuated by a permanent magnet 34 and an alternating current energized coil 35 on the chopper arm. The reference signal developed across resistor 31 is fed to a center tap of coil 32 whereby the difference between the signal from the thermopile and the reference signal is applied with alternating polarity to the coil 32 which comprises a differential input of amplifier 36. Amplifier 36 has a first stage 37 thereof inductively coupled to receive the difference between the reference and thermopile signals and feeds this difference via the second stage 38 to an output stage 39 comprising a pair of triodes 40, 41 having the plates thereof respectively coupled to opposite ends of a center-tap grounded coil 42. The coil 42 is energized from a suitable source of alternating current (not shown) which as indicated also energizes coil 35 of the chopper arm 33. Coupled across the cathodes of output stage tubes 40 and 41 is a diode 43 which is series connected with coil 44 of a sensitive relay including normally open contacts 45. Contacts 45 are series connected with a voltage source (not shown) and power control relay coil 46 which opens contacts 19 when energized.

In operation the part to be heated is placed at the top of the housing 22 in contact with the transite cap 21 and the switch 18 is closed, starting the induction heating generator and energizing the heating coil which then heats the area of the part 26 proximate thereto. Heat radiated from the center of the part 26 axially of the coil 12 is focused by lens 24 upon thermopile 23 at the opposite end of the housing 22 whereby a temperature signal indicative of the temperature of the center of the heated area is fed to alternate ends of coil 32 through the vibrating chopper arm 33. Temperature adjustment 30 has been preset to produce a reference signal across resistor 31 which is equal to the temperature signal from thermopile 23 when the center of the heated part 26 is at a predetermined temperature. Since the amount of radiation of the heated part, and therefore the resultant output voltage of the thermopile is dependent not only upon the temperature of the part, but also upon the emissivity of the heated materials, there is provided the calibrating resistor 29 and meter 28. This calibration which also compensates for voltage drop in the reference cell 27 due to aging is effected by adjusting resistor 30 to an extreme position which may indicate, for example, a temperature of 1,000° F. and then adjusting the resistor 29 to obtain a predetermined reading on the meter.

The relative polarities of the cathodes of tubes 40 and 41 is dependent upon the relative phase of the plate voltages thereof and of the differential input to the amplifier. The circuit is adjusted so that the cathode of tube 41 is positive with respect to the cathode of tube 40 when the thermopile voltage is less than the reference voltage whereby current will not flow in coil 44 due to the indicated polarity of diode 43. When the thermopile voltage is equal to or exceeds the preset reference voltage, the potential of the cathode of tube 40 will be above the potential of the cathode of tube 41 whereby the diode will conduct, sensitive relay coil 44 is energized, contacts 45 are closed, coil 46 is energized and contacts 19 are opened to break the power supply to the induction heating generator. It will be seen that the disclosed amplifier output circuit is sensitive to but a single sense of the difference between the temperature signal from the thermopile and the reference signal or to equality thereof and as long as this difference is zero or of any magnitude of such one sense, the induction generator is de-energized. If the heated material remains over the coil, the generator will turn on again after the temperature is lowered a few degrees and the heating cycle will be repeated.

Referring now to Fig. 2, the principles of the present invention may be applied for proportional temperature control to obtain a generator output which varies in accordance with the sensed temperature of the heated object. Since the relative potential of the cathodes of tubes 40, 41 of the output stage of the amplifier is proportional to the magnitude of the input difference signal a proportional single sense operation is obtained by substituting for the sensitive relay 44 of Fig. 1 an amplifier 48 which has the input thereof series connected between the cathode of tube 41 and the diode 43. The output of amplifier 48, proportional to the difference between the temperature signal and reference signal, is coupled to the bias resistor 17 of the induction heating oscillator 10 to thereby inversely control the generator output in accordance with the sensed temperature. Except for the substitution of the input of amplifier 48 for the relay elements 44, 45, 19 and 46, the apparatus illustrated in Fig. 2 may be the same as that shown in Fig. 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A temperature controlled heating system comprising a heating coil, a thermopile spaced from said coil for generating a temperature signal indicative of heat radiated through said coil, means interposed between said coil and said thermopile for focusing upon said thermopile heat radiated coaxially of said coil, adjustable reference circuit means including an adjustable source of electrical potential for generating a reference signal indicative of a selected temperature of an object to be heated by said coil, and means responsive to said reference and temperature signals for controlling energization of said coil.

2. A temperature controlled heating system comprising an induction heating coil, a heating generator coupled with said coil, a thermopile mounted in spaced relation to said coil, a heat focusing lens mounted between said thermopile and coil for focusing upon said thermopile heat radiated axially of said coil by an object heated thereby, a reference circuit including a series connected potential source, meter and variable impedance for generating a selectable reference signal, an amplifier having a differential input, means for coupling said thermopile and reference circuit to said differential input, said amplifier having an output stage including a pair of electronic valves each having a plate, cathode and grid, means for alternately energizing said plates at a predetermined frequency, means for changing the polarity of the input to said amplifier at said frequency, means for coupling said differential input to said grids, a series connected diode and relay coil connected across said cathodes, and means responsive to said relay coil for de-energizing said heating generator.

3. A controlled heating system comprising an induction heating coil, generator means for energizing said coil, focused heat beam temperature sensing means responsive to heat radiated axially of said coil for generating a temperature signal indicative of said radiated heat, a source of continuous electrical reference signal, an amplifier having an output circuit, unidirectional means for conducting current in response to a predetermined relative polarity of voltages in said output circuit, means responsive to said unidirectional means for controlling said generating means, and means for feeding the difference between said temperature and reference signal to said amplifier.

4. A temperature controlled heating system comprising a housing having a heating coil mounted at one end thereof, an annular cap mounted coaxially of said coil and adjacent thereto, a thermopile mounted in said housing for generating a temperature signal indicative of heat radiated thereon, means interposed between said coil and said thermopile for focusing upon said thermopile heat radiated coaxially of said cap and coil, adjustable reference circuit means for generating an electric reference signal indicative of a selected temperature of an object to be heated by said coil, an amplifier having a differential chopper input for receiving said temperature and reference signals, said amplifier having an output circuit including a unidirectional device responsive to a predetermined sense of the difference between said temperature and reference signal inputs for controlling energization of said coil.

5. A temperature controlled heating system comprising an induction heating coil, a heating generator coupled with said coil, a thermopile spaced from said coil, a heat focusing lens mounted between said thermopile and coil for focusing upon said thermopile heat radiated axially of said coil by an object heated thereby, a reference circuit including a series connected potential source, meter and variable impedance for generating a selectable reference signal, an amplifier having a differential input, means for coupling said thermopile and reference circuit to said differential input, said amplifier having an output stage including a pair of electronic valves each having a plate, cathode and grid, means for alternately energizing said plates at a predetermined frequency, means for changing the polarity of the input to said amplifier at said frequency, means for coupling said differential input to said grids, a diode having one side thereof coupled with one of said cathodes, and means coupled between the other side of said diode and the other of said cathodes for controlling said heating generator.

6. A temperature controlled heating system comprising an induction heating coil, a heating generator coupled with said coil, a thermopile spaced from said coil, a heat focusing lens mounted between said thermopile and coil for focusing upon said thermopile heat radiated axially of said coil by an object heated thereby, a reference circuit including a series connected potential source, meter and variable impedance for generating a selectable reference signal, an amplifier having a differential input, means for coupling said thermopile and reference circuit to said differential input; said amplifier having an output stage including a pair of electronic valves each having a plate, cathode and grid, means for alternately energizing said plates at a predetermined frequency, means for changing the polarity of the input to said amplifier at said frequency, means for coupling said differential input to said grids, a diode, a proportional control amplifier having the input thereof series coupled with said diode across said cathodes, and means responsive to said control amplifier for controlling the energization of said heating generator.

7. A controlled heating system comprising an induction heating coil, generator means for energizing said coil, focused heat beam temperature sensing means responsive to heat radiated axially of said coil for generating an electrical temperature signal indicative of said radiated heat, said sensing means including a thermopile spaced from said coil and a lens axially aligned with said thermopile and coil and interposed therebetween, a source of electrical reference signal, an amplifier having an output circuit, unidirectional means for conducting current proportional to the magnitude of a potential difference of a predetermined polarity in said output circuit, means responsive to current flow in said unidirectional means for controlling said generating means, and means for feeding the difference between said electrical temperature and reference signal, to said amplifier.

References Cited in the file of this patent
UNITED STATES PATENTS

| | | |
|---|---|---|
| 2,404,147 | Strickland, Jr. | July 16, 1946 |
| 2,640,137 | Ketchledge | May 26, 1953 |